(12) United States Patent
Chang et al.

(10) Patent No.: US 12,468,624 B2
(45) Date of Patent: Nov. 11, 2025

(54) HOT-DATA-BASED DECISION-MAKING METHOD FOR USING IN A STORAGE DEVICE OF A COMPUTER

(71) Applicant: TrustTeks Ltd., Hsinchu (TW)

(72) Inventors: Yuan-Mao Chang, Hsinchu (TW); Wan-Ru Lin, Hsinchu (TW)

(73) Assignee: TrustTeks Ltd., Hsinchu (TW)

( * ) Notice: Subject to any disclaimer, the term of this patent is extended or adjusted under 35 U.S.C. 154(b) by 0 days.

(21) Appl. No.: 18/600,812

(22) Filed: Mar. 11, 2024

(65) Prior Publication Data

US 2025/0284625 A1    Sep. 11, 2025

(51) Int. Cl.
*G06F 12/00* (2006.01)
*G06F 12/02* (2006.01)

(52) U.S. Cl.
CPC ................... *G06F 12/0223* (2013.01)

(58) Field of Classification Search
CPC .................................................. G06F 12/0223
See application file for complete search history.

(56) References Cited

U.S. PATENT DOCUMENTS

| | | | |
|---|---|---|---|
| 9,390,116 B1 * | 7/2016 | Li | G06F 16/2272 |
| 9,684,469 B1 * | 6/2017 | Douglis | G06F 12/0269 |
| 2014/0250281 A1 * | 9/2014 | Rao | G06F 12/0223 |
| | | | 711/156 |
| 2017/0212837 A1 * | 7/2017 | Breternitz | G06F 3/0611 |
| 2017/0212845 A1 * | 7/2017 | Conway | G06F 12/1027 |
| 2017/0285971 A1 * | 10/2017 | Dai | G06F 3/0653 |
| 2022/0269657 A1 * | 8/2022 | Sanders | G06F 3/0641 |

FOREIGN PATENT DOCUMENTS

| | | | | |
|---|---|---|---|---|
| CN | 114296630 B | * | 7/2024 | G06F 12/0253 |
| KR | 20230097755 A | * | 7/2023 | G06F 3/0604 |

OTHER PUBLICATIONS

Fan et al. "Cuckoo Filter: Practically Better Than Bloom", 2014, CMU School of Computer Science.

* cited by examiner

*Primary Examiner* — Shawn X Gu
*Assistant Examiner* — Mohammad S Hasan
(74) *Attorney, Agent, or Firm* — WPAT, PC

(57) ABSTRACT

A hot-data-based decision-making method for using in a computer having a storage device that includes plural storage units. The method includes processing a new datum to obtain a new data fingerprint and at least two storage index values; and determining whether a datum in the storage unit corresponding to any of the storage index values matches the new datum, and if so, generating an update hotness score by updating a pre-stored hotness score of an old data fingerprint of an old datum, wherein the old datum is hot if the update hotness score is not lower than a hotness threshold score, or is cold if it is lower; or, otherwise, determining whether the storage unit is blank, and if so, simply storing the new data fingerprint into the storage unit, or, otherwise, replacing an existing data fingerprint in the storage unit with the new data fingerprint.

15 Claims, 6 Drawing Sheets

| Command Index | 0 | . | 127 | 128 | . | 255 | . | 2047 | 2048 | . | 2175 | 2176 | 2177 | . | 2303 | . | 4095 |
|---|---|---|---|---|---|---|---|---|---|---|---|---|---|---|---|---|---|
| Segment Index | 0 | . | . | 1 | . | . | . | 15 | 0 | . | . | 1 | . | . | . | . | 15 |
| Epoch Index | 0 | | | | | | | | 1 | | | | | | | | |
| Previous Access | | | | | ■ A1 | | | | | | | | | | | | |
| Current Access | | | | ■ B1 | | | | | | | | | | | | | |

FIG. 3

| Command Index | 0 | . | 127 | 128 | . | 255 | . | 2047 | 2048 | . | 2175 | 2176 | 2177 | . | 2303 | . | 4095 |
|---|---|---|---|---|---|---|---|---|---|---|---|---|---|---|---|---|---|
| Segment Index | 0 | . | 0 | 1 | . | 1 | . | 15 | 0 | . | 0 | 1 | 1 | . | 1 | . | 15 |
| Epoch Index | 0 | | | | | | | | 1 | | | | | | | | |
| Previous Access | ▨ (A2) | | | | | | | | | | | | | | | | |
| Current Access | | | | ▨ (B2) | | | | | | | | | | | | | |

FIG. 4

| Command Index | 0 | . | 127 | 128 | . | 255 | . | 2047 | 2048 | . | 2175 | 2176 | 2177 | . | 2303 | . | . | 4095 |
|---|---|---|---|---|---|---|---|---|---|---|---|---|---|---|---|---|---|---|
| Segment Index | 0 | . | | 1 | . | . | . | 15 | 0 | . | . | . | 1 | . | . | . | . | 15 |
| Epoch Index | 0 | | | | | | | | | | | 1 | | | | | | |
| Previous Access | ■ (A3) | | | | | | | | | | | | | | | | | |
| Current Access | | | | | | | | | | | | | | | ■ (B3) | | | |

FIG. 5

| Command Index | 0 | . | 127 | 128 | . | 255 | . | 2047 | 2048 | . | 2175 | 2176 | 2177 | . | 2303 | . | 4095 |
|---|---|---|---|---|---|---|---|---|---|---|---|---|---|---|---|---|---|
| Segment Index | 0 | . | | | . | 1 | . | 15 | | . | | | 1 | . | | . | 15 |
| Epoch Index | | | | | | | | | 0 | | | | 1 | | | | |
| Previous Access | | | | | | ■ A4 | | | | | | | | | | | |
| Current Access | | | | | | | | | | | | | ■ B4 | | | | |

FIG. 6

HOT-DATA-BASED DECISION-MAKING METHOD FOR USING IN A STORAGE DEVICE OF A COMPUTER

BACKGROUND OF THE INVENTION

1. Technical Field

The present invention relates to decision-making methods for computers, and more particularly to a hot-data-based decision-making method for using in a storage device of a computer.

2. Description of Related Art

Typically, in a computer system, a central processing unit (CPU), a cache, a random-access memory (RAM), and a hard drive jointly form a data accessing structure and work together to achieve effective data processing and storage. Therein, the CPU, acting as the brain of the computer, serves to execute commands and perform computing. For processing data, the CPU loads and executes relevant commands. In order to access data fast, most frequently accessed data and commands are usually stored in the cache, and the CPU always checks the cache first before going to other RAMs, and data stored in the cache can be retrieved fast. A cache allows fast data accessing but it costs more money than other memories. A RAM is where the computer places applications and data currently in use. While a RAM has relatively high capacity, its data accessing operation takes longer time than a cache. A hard drive is a permanent storage device for storing operating systems, applications, and data, and it is the slowest in terms of data accessing. When a computer is booted up, the operating system and some frequently accessed programs are loaded into the RAM from the hard drive, so as to ensure fast preparation of the system. Besides, frequently accessed data will also be stored in the cache for efficient calling.

Briefly, the foregoing data accessing process is a hierarchical system, in which storage devices at different hierarchical levels are made with different data accessing rates and capacity properties so as to enable a computer to access data fast and cache datum efficiently. Such cooperation among these storage devices ensures good performance of the computer in complicated tasks. However, for meeting increasingly demanding efficiency requirements for data processing, making significant increase in capacity for existing caches and RAMs would be uneconomic. Hence, it is believed that improvement in efficiency of data accessing without adding costs is desirable in the art.

SUMMARY OF THE INVENTION

A primary objective of the present invention is to provide a method for improving data-accessing efficiency without increasing hardware requirements of computers.

To achieve the fore going objective, one embodiment of the present invention provides a hot-data-based decision-making method for accessing data in a storage device of a computer. The storage device includes a plurality of storage units. The hot-data-based decision-making method comprises a data pre-processing step, an old datum comparing step, an old datum updating step, a new datum updating step, a new datum storing step, and a new datum replacing step. The data pre-processing step comprises extracting a new data fingerprint from a new datum, and hashing the new datum so as to obtain at least two storage index values, in which the storage index values each correspond to one of the storage units. The old datum comparing step comprises determining whether a datum stored in the storage unit corresponding to any of the at least two storage index values is identical to the new datum, determining that the new datum is an old datum if so, and proceeding with the old datum updating step, or determining that the new datum is not the old datum if not so, and proceeding with the new datum updating step. The old datum updating step comprises: updating a pre-stored hotness score of an old data fingerprint of the old datum to generate an update hotness score, wherein if the update hotness score is not lower than a hotness threshold score, the old datum is determined as a hot datum, or if the update hotness score is lower than the hotness threshold score, the old datum is determined as a cold datum; and in which the new datum updating step comprises: determining whether the storage unit corresponding to the storage index value is blank or has had an existing data fingerprint of an existing datum stored therein, correspondingly storing the new data fingerprint, and marking the new data fingerprint with a new hotness score.

Thereby, the present invention determines data hotness and reads data accordingly, thereby achieving efficient data accessing and accurate data reading.

BRIEF DESCRIPTION OF THE DRAWINGS

FIG. 3 through FIG. 6 illustrate data addresses and epochs in a hot-data-based decision-making method for using in a storage device of a computer according to preferred embodiments of the present invention.

DETAILED DESCRIPTION OF THE INVENTION

Figure 1:
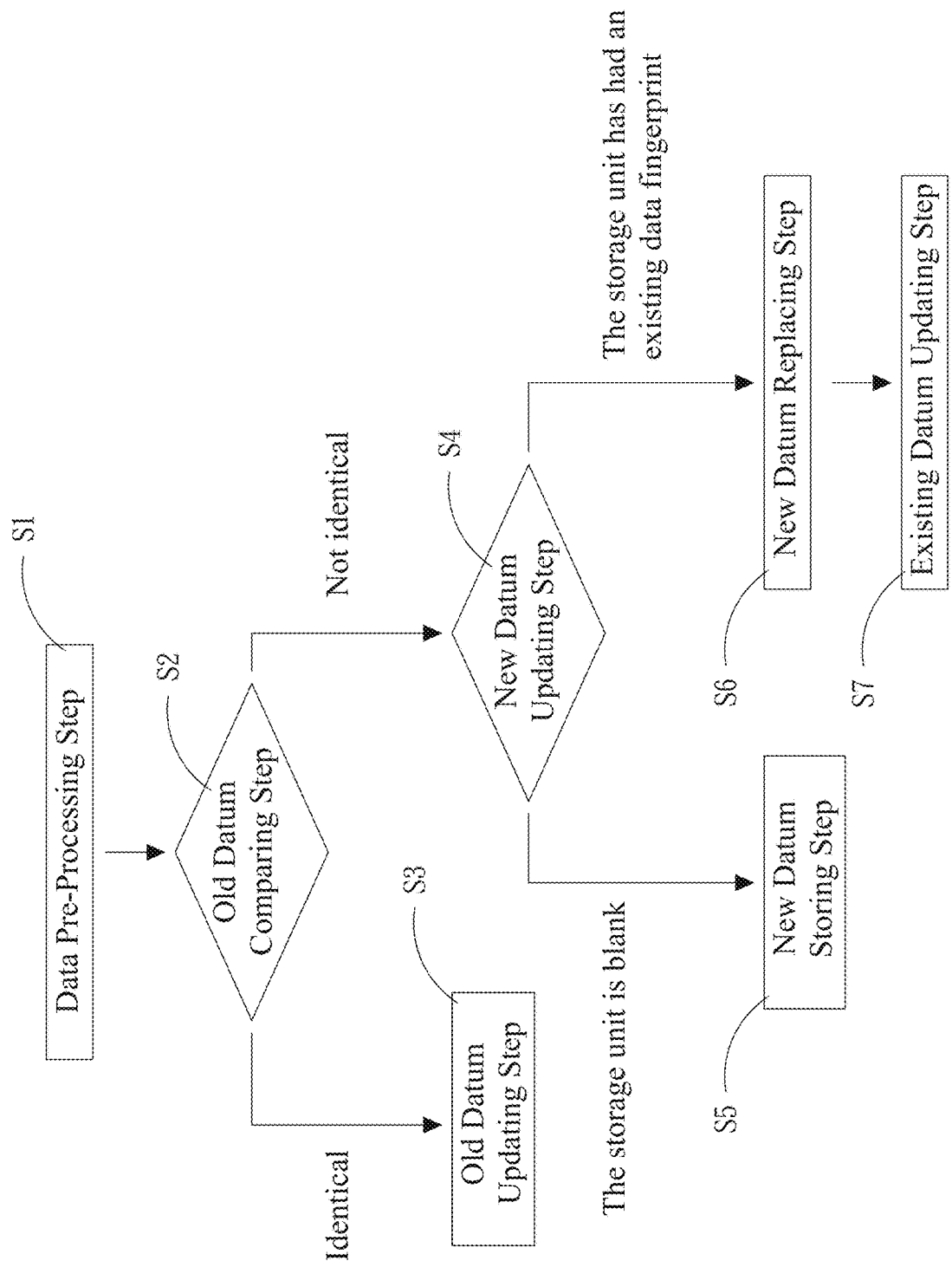
FIG. 1 is a flowchart of a hot-data-based decision-making method when used for a storage device of a computer according to one preferred embodiment of the present invention.

Referring to FIG. 1 through FIG. 6, in an embodiment of the present invention, a hot-data-based decision-making method is provided for accessing data in a storage device of a computer. The storage device includes a plurality of storage units. The disclosed method comprises a data pre-processing step S1, an old datum comparing step S2, an old datum updating step S3, a new datum updating step S4, a new datum storing step S5, and a new datum replacing step S6. Therein, the storage units each have a plurality of entries and can store multiple data fingerprints. Herein, the filter used in the storage device is a cuckoo filter.

Furthermore, the storage units are able to store data including data fingerprints, storage index value serial numbers corresponding to storage index values, hotness scores and timestamps corresponding to data fingerprints, etc. During the process of data accessing and updating, the computer carries out calculation and analysis on the aforementioned data so as to complete data updating process accurately. The detailed implementation of the present invention will be as followed.

The data pre-processing step S1 involves extracting a new data fingerprint from a new datum, and hashing the new datum so as to obtain at least two storage index values, wherein the storage index values each correspond to one of the storage units.

Therein, in the data pre-processing step S1, there may be a plurality of the storage index values, which may be obtained by successively hashing and XORing the new data fingerprint and the new datum, and then determine a storage index value serial number according to their obtainment order. In further detail, the new data fingerprint is obtained using Equation (1) below, and the storage index values herein are obtained using Equations (2) and (3) below, without limitation:

$$F = \text{fingerprint}(x) \quad \text{Equation (1)}$$

where $F$ denotes the new fingerprint and $x$ denotes the new datum;

$$i_0 = \text{hash}(x) \quad \text{Equation (2)}$$

where $i_0$ represents the ordinally first storage index value, 0 represents the corresponding storage index value serial number of the storage index value, and $x$ represents the new datum; and $$i_n = i_0 \wedge \text{hash}(n*F) \quad \text{Equation (3)}$$

where $n$ is a positive integer, $i_n$ represents the ordinally $n^{th}$ storage index value, $F$ represents the new data fingerprint, and $*$ denotes the multiplication operator.

The old datum comparing step S2 involves determining whether the datum stored in the storage unit corresponding to any of the storage index values is identical to the new datum. A positive result indicates that the new datum is actually an old datum, which means that the new datum has been present in the computer, so the method proceeds with the old datum updating step S3. On the contrary, if none of the storage index values is identical to the new datum, this means that the new datum is not the old datum pre-existing in the storage unit, and therefore the new datum updating step S4 is to be conducted. Therein, if the new datum is identical to the old datum existing in the storage unit, a successful match is reflected in the cuckoo filter. This is herein referred to as a "hit."

Figure 2:
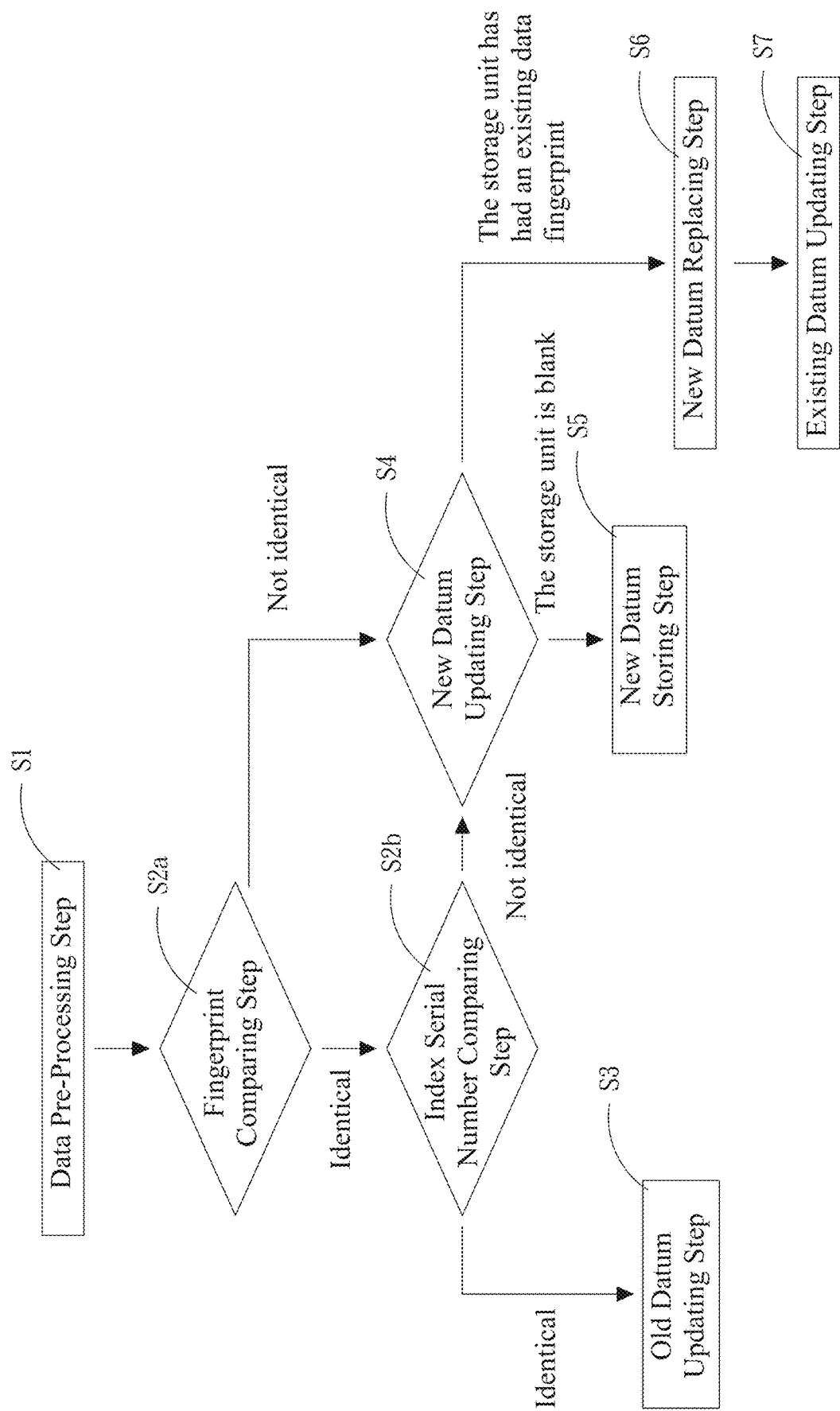
FIG. 2 is a flowchart of a hot-data-based decision-making method when used for a storage device of a computer according to one more preferred embodiment of the present invention.

As shown in FIG. 2, in the preferred embodiment of the present invention, the old datum comparing step S2 further comprises a fingerprint comparing step S2a and an index serial number comparing step S2b.

The fingerprint comparing step S2a is about determining whether the data fingerprint in the storage unit is identical to the new data fingerprint. If the answer is no, it is determined that the new datum is not the old datum, and the method proceeds with the new datum updating step S4. If the two are identical, the method proceeds with the index serial number comparing step S2b.

In the index serial number comparing step S2b, if the corresponding storage index value serial number of the storage index values of the new datum are different from that of the old datum, it is determined that the new datum is not the old datum, and the method proceeds with the new datum updating step S4. If the new datum and the old datum have the same storage index value serial number, it is determined that the new datum is actually the old datum that has existed in the computer. In this case, the method proceeds with the old datum updating step S3.

In further detail, since the new data fingerprint is obtained from the new datum using Equation (1) in a simplified manner, it is possible that two different data share the same data fingerprint. Therefore, it is desirable that storage index value serial number is also compared to further prevent mismatch and improve overall accuracy.

For example, there is an old datum A stored in the storage units and there is a new datum B. Therein, the old datum A has an original value $X_A=200$. As determined through computing, the old datum A has a data fingerprint $F_A=17$, and has three storage index values, which are $i_{0\_A}=158$, $i_{1\_A}=228$, and $i_{2\_A}=350$, where 0, 1, and 2 are the respective corresponding storage index value serial number of the storage index values. The new datum B has an original value $X_B=299$. As determined through computing, the new datum B has a data fingerprint $F_B=17$, and has three storage index values, which are $i_{0\_B}=11$, $i_{1\_B}=158$, and $i_{2\_B}=78$, where 0, 1, and 2 are the respective corresponding storage index value serial number of the storage index values. With the information given above, in the fingerprint comparing step S2a, since $F_A$ and $F_B$ are both 17, the old datum A and the new datum B would be determined as identical. Nevertheless, in the complementary index serial number comparing step S2b, since the old datum A and the new datum B have different storage index value serial numbers in the same storage index value ($i_{0\_A}=158$ and $i_{1\_B}=158$ have the same storage index value but their storage index value serial numbers are different), they will be determined as different from each other.

With the foregoing double comparison accomplished by the fingerprint comparing step S2a and the index serial number comparing step S2b, the disclosed method can be used to determine whether the old datum A and the new datum B are identical accurately and prevent false hits. As proven in experiments, using the fingerprint comparing step S2a solely for data comparison led to false positives (i.e., wrongly determining that the old datum A and the new datum B were identical) in a rate of about 0.75%, compared to about 0.0002% when the index serial number comparing step S2b was complementally conducted.

The old datum updating step S3 involves updating a pre-stored hotness score of an old data fingerprint of the old datum to generate an update hotness score. If the update hotness score is not lower than a hotness threshold score, it is determined that the old datum is a hot datum. If the update hotness score is lower than the hotness threshold score, it is determined that the old datum is a cold datum. The datum determined as hot is temporarily stored in a RAM or cache of a relatively high level for fast access. The datum determined as cold is moved to a RAM of a relatively low level or deleted from the RAM simply. In this manner, data stored in caches or RAMs can be organized in accordance with their hotness so as to facilitate efficient data updating in the computer.

In the old datum updating step S3, for the old data fingerprint, a hotness addition score is marked, and then a hotness decay score according to a timestamp of the old data fingerprint is marked. Afterward, computing is performed with the pre-stored hotness score, the hotness addition score, and the hotness decay score for updating, and the update hotness score can be generated.

In further detail, the hotness decay score is determined according to a segment difference and an epoch difference between an old timestamp of the old datum's previous hit and a new timestamp of the old datum corresponding to its last hit. In FIG. 3 through FIG. 6, data addresses over two epochs are shown. Every 128 addresses form a segment, and every 16 segments form an epoch. The hotness decay score includes a segment decay score and an epoch decay score corresponding to the segment difference and the epoch difference. The exact numerical decreases in the segment decay score and in the epoch decay score can be figured out using a lookup table. The hotness decay score is determined using $$\text{decay\_score} = \text{decay\_score}_{segment} + \text{decay\_score}_{epoch}, \text{ where}$$

decay_score represents the hotness decay score, decay_score$_{segment}$ represents the segment decay score, and decay_score$_{epoch}$ represents the epoch decay score.

Equation (4)

For example, as shown in FIG. 3, the previous access to the datum was made at the time corresponding to the old timestamp A1, and the current access to the datum is happening at the new timestamp B1. When the old timestamp A1 and the new timestamp B1 are in the same segment and in the same epoch, since they are so close to each other in the present embodiment, the hotness decay score is marked as 0.

As shown in FIG. 4, when the old timestamp A2 and the new timestamp B2 are in different segments but in the same epoch, the hotness decay score can be easily obtained from the segment decay score using Equation (4).

As shown in FIG. 5, if the old timestamp A3 and the new timestamp B3 are in different epochs, the sites of the old timestamp and of the new timestamp have to be further considered. If the epoch value and the segment value of the new timestamp are greater than those of the old timestamp, respectively, the hotness decay score can be obtained from the segment decay score and the epoch decay score using Equation (4).

As shown in FIG. 6, if the old timestamp A4 and the new timestamp B4 are in different epochs, the sites of the old timestamp and of the new timestamp have to be further considered. If the epoch value of the new timestamp is greater than that of the old timestamp, but the segment value of the new timestamp is smaller than that of the old timestamp, the hotness decay score can be obtained from the segment decay score and the epoch decay score using Equation (4).

Following the above, the update hotness score is obtained using Equation (5) below:

Equation (5)

$$\text{next\_score} = \text{prev\_score} - \text{decay\_score} * \text{decay\_num} + \text{add\_score}, \text{ where}$$

next_score denotes the update hotness score, prev_score denotes the pre-stored hotness score, decay_score denotes the hotness decay score, * is the multiplication operator, decay_num denotes the decay weight, and add_score denotes the hotness addition score. Therein, the decay weight is determined by dividing the pre-stored hotness score by the hotness addition score (i.e., decay_num = prev_score /add_score).

According to the embodiment of the present invention, in the old datum updating step S3, for each of the data fingerprints, a hotness decay score corresponding to its timestamp is marked, and a corresponding update hotness score is also updated and generated. If the update hotness score is smaller than or equal to a hotness baseline (herein set as 0), the data fingerprint is directly deleted from the storage unit or entry it is in. Herein, the data fingerprints are those that have been stored in the storage units or entries and have not been recorded with any "hit." Thus, the update hotness score of each of these data fingerprints is obtained using Equation (6) below:

Equation (6)

$$\text{next\_score} = \text{prev\_score} - \text{decay\_score} * \text{decay\_num}, \text{ where next\_score}$$

represents the update hotness score, prev_score represents the pre-stored hotness score, decay_score represents the hotness decay score, * represents the multiplication operator, and decay_num represents the decay weight.

Referring to FIG. 2, the new datum updating step S4 is about determining whether the storage unit corresponding to the storage index value is blank or has had an existing data fingerprint of any existing datum stored therein. If it is blank, the method proceeds with the new datum storing step S5. Otherwise, the method proceeds with the new datum replacing step S6.

In the new datum storing step S5, the new data fingerprint is stored into the blank storage unit directly, and the new data fingerprint is marked with a new hotness score. In the new datum storing step S5, the new hotness score is smaller than the hotness threshold score so as to prevent the computer from wrongly updating the data.

The new datum replacing step S6 involves replacing the existing data fingerprint in the storage unit with the new data fingerprint and marking the new data fingerprint with the new hotness score.

According to the embodiment of the present invention, in the new datum replacing step S6, for each of the data fingerprints, a hotness decay score corresponding to its timestamp is marked, and a corresponding update hotness score is also updated and generated. If the update hotness score is smaller than or equal to a hotness baseline (herein set as 0), the data fingerprint is directly deleted from the storage unit or entry it is in. Herein, the data fingerprints are those that have been stored in the storage units or entries and have not been recorded with any "hit." Thus, the update hotness score of each of these data fingerprints is obtained using Equation (6) as described previously.

According to the embodiment of the present invention, the new datum replacing step S6 is followed by an existing datum updating step S7, wherein the replaced existing data fingerprint is stored into the storage unit corresponding to the ordinally next existing storage index value according to the storage index value serial number of an existing storage index value of the existing datum.

Further, in the existing datum updating step S7, in the process of updating the existing data fingerprint, replacement and storage may be repeated at the storage units corresponding to the ordinally next storage index values until there is a storage unit for the existing data fingerprint that was originally blank. Further, in some embodiments of the present invention, a maximum update count limit may be defined so that when the number of times of updating the existing data fingerprint reaches the maximum update count limit, the existing data fingerprint stops updating, which means that the existing data fingerprint stays at the site of its last updating, thereby preventing the computer from over-computing.

Moreover, according to other embodiments, in the existing datum updating step S7, the storage units each have a plurality of entries so that the storage units can store multiple data fingerprints. The replaced existing data fingerprint can replace the data fingerprint that has the lowest update hotness score in the ordinally next storage unit so as to achieve efficient replacement of data fingerprints.

Thereby, the present invention has the following advantages:
1. The present invention helps improve efficiency of data accessing in the computer by reading data with reference to data hotness;
2. With the fingerprint comparing step S2a and the index serial number comparing step S2b, the present invention implements double comparison steps so as to accurately match data and in turn reduce false positives.
3. Through computing based on timestamps and hotness scores, the present invention helps accurate determination of data hotness, thereby allowing the computer to update and search data efficiently and protecting frequently accessed data from being wrongly deleted.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A hot-data-based decision-making method for using use in a storage device of a computer to facilitate data accessing, wherein the storage device includes a plurality of storage units, and the hot-data-based decision-making method comprises:
   a data pre-processing step for extracting a new data fingerprint from a new datum, and hashing the new datum so as to obtain at least two storage index values, in which the storage index values each correspond to one of the storage units; and
   an old datum comparing step for determining whether a datum stored in a storage unit corresponding to any of the at least two storage index values is identical in value and sequence to the new datum, determining that the new datum is an old datum if so, and proceeding with an old datum updating step, or determining that the new datum is not the old datum if not so, and proceeding with a new datum updating step;
   in which the old datum updating step comprises:
   updating a pre-stored hotness score of an old data fingerprint of the old datum to generate an update hotness score, wherein if the update hotness score is not lower than a hotness threshold score, the old datum is determined as a hot datum, or if the update hotness score is lower than the hotness threshold score, the old datum is determined as a cold datum; and
   in which the new datum updating step comprises:
   determining whether the storage unit corresponding to the storage index value is blank or has had an existing data fingerprint of an existing datum stored therein, correspondingly storing the new data fingerprint, and marking the new data fingerprint with a new hotness score.

2. The hot-data-based decision-making method of claim 1, further comprising, following the new datum updating step, proceeding with a new datum storing step if the storage unit is blank, or proceeding with a new datum replacing step if the storage unit has had stored with the existing data fingerprint;
   wherein the new datum storing step comprises:
   storing the new data fingerprint into the blank storage unit directly, and marking the new data fingerprint with the new hotness score; and
   the new datum replacing step comprises:
   replacing the existing data fingerprint in the storage unit with the new data fingerprint, and marking the new data fingerprint with the new hotness score.

3. The hot-data-based decision-making method of claim 2, wherein the storage units each have a plurality of entries so that each of the storage units can store plural said data fingerprints.

4. The hot-data-based decision-making method of claim 2, wherein in the data pre-processing step, there are a plurality of the storage index values, which are obtained by successively hashing and XORing the new data fingerprint and the new datum so that the storage index values determine a storage index value serial number according to an obtainment order thereof.

5. The hot-data-based decision-making method of claim 4, wherein the new datum replacing step is followed by an existing datum updating step that comprises storing the replaced existing data fingerprint, according to the storage index value serial number of an existing storage index value of the existing datum, into the storage unit corresponding to the ordinally next existing storage index value.

6. The hot-data-based decision-making method of claim 5, wherein the storage units each have a plurality of entries so that each of the storage units can store plural said data fingerprints, and in the existing datum updating step, the replaced existing data fingerprint replaces the data fingerprint having the lowest update hotness score in the ordinally next storage unit.

7. The hot-data-based decision-making method of claim 5, wherein in the existing datum updating step, when a number of times of updating the existing data fingerprint reaches a maximum update count limit, the existing data fingerprint is no more updated.

8. The hot-data-based decision-making method of claim 4, wherein the old datum comparing step further comprises:
   a fingerprint comparing step for determining whether the data fingerprint in the storage unit is identical to the new data fingerprint; and
   proceeding with the new datum updating step as the new datum is not the old datum if not so or otherwise proceeding with an index serial number comparing step if so;
   wherein the index serial number comparing step comprises:
   determining that the new datum is not the old datum if the storage index value serial number stored in the storage unit corresponding to the storage index value of the new datum is different from the storage index value serial number of the old datum, and proceeding with the new datum updating step; or
   determining that the new datum is actually the old datum if the storage index value serial number of the new datum and the storage index value serial number of the old datum are identical, and proceeding with the old datum updating step.

9. The hot-data-based decision-making method of claim 1, wherein the old datum updating step comprises marking the old data fingerprint with a hotness addition score, marking a hotness decay score according to a timestamp of the old data fingerprint, and calculating the pre-stored hotness score, the hotness addition score, and the hotness decay score for updating and to generate the update hotness score.

10. The hot-data-based decision-making method of claim 9, wherein in the old datum updating step, the hotness decay score is generated according to a segment difference and an epoch difference between an old timestamp corresponding to a previous hit with the old datum and a new timestamp corresponding to a last hit with the old datum.

11. The hot-data-based decision-making method of claim 10, wherein the hotness decay score is determined using an equation:

decay_score=decay_score$_{segment}$+decay_score$_{epoch}$, where decay_score represents the hotness decay score, decay_score$_{segment}$ represents a segment decay score corresponding to the segment difference, and decay_score$_{epoch}$ represents an epoch decay score corresponding to the epoch difference.

12. The hot-data-based decision-making method of claim 11, wherein in the old datum updating step, the update hotness score is determined using an equation:

next_score=prev_score−decay_score*decay_num+add_score, where next score represents the update hotness score, prev_score represents the pre-stored hotness score, decay_score represents the hotness decay score, * represents a multiplication operator, decay_num represents a decay weight, and add score represents the hotness addition score.

13. The hot-data-based decision-making method of claim 1, wherein the storage units each have a plurality of entries so that the storage units can store plural data fingerprints, and in the old datum updating step, for each of the data fingerprints, a hotness decay score corresponding to its timestamp is marked, and a corresponding update hotness score is also generated, in which if the update hotness score is smaller than or equal to a hotness baseline, the data fingerprint is directly deleted from the corresponding entry.

14. The hot-data-based decision-making method of claim 1, wherein in the new datum storing step, the new hotness score is smaller than the hotness threshold score.

15. The hot-data-based decision-making method of claim 2, wherein the storage units each have a plurality of entries so that the storage units can store plural said data fingerprints, and in the new datum replacing step, for each of the data fingerprints, a hotness decay score corresponding to its timestamp is marked, and a corresponding update hotness score is also updated and generated, in which if the update hotness score is smaller than or equal to a hotness baseline, the data fingerprint is directly deleted from the corresponding entry.

* * * * *